US012652143B2

(12) United States Patent
Liu

(10) Patent No.: US 12,652,143 B2
(45) Date of Patent: Jun. 9, 2026

(54) FEEDBACK METHOD, USER EQUIPMENT, AND STORAGE MEDIUM

(71) Applicant: SPREADTRUM COMMUNICATIONS (SHANGHAI) CO., LTD., Shanghai (CN)

(72) Inventor: Xing Liu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 287 days.

(21) Appl. No.: 18/555,619

(22) PCT Filed: Apr. 15, 2022

(86) PCT No.: PCT/CN2022/087115
§ 371 (c)(1),
(2) Date: Oct. 16, 2023

(87) PCT Pub. No.: WO2022/218416
PCT Pub. Date: Oct. 20, 2022

(65) Prior Publication Data
US 2024/0204966 A1     Jun. 20, 2024

(30) Foreign Application Priority Data
Apr. 16, 2021    (CN) .......................... 202110411722.6

(51) Int. Cl.
H04L 5/00 (2006.01)
H04W 72/1268 (2023.01)
(52) U.S. Cl.
CPC ....... H04L 5/0055 (2013.01); H04W 72/1268 (2013.01)

(58) Field of Classification Search
CPC ......................... H04L 5/0055; H04W 72/1268
See application file for complete search history.

(56) References Cited

U.S. PATENT DOCUMENTS

2012/0201151 A1* 8/2012 Kubota ................. H04L 1/1851
                                                            370/252
2012/0275440 A1* 11/2012 Park ..................... H04L 1/1838
                                                            370/336
(Continued)

FOREIGN PATENT DOCUMENTS

CN        110291738 A      9/2019
CN        111031580 A      4/2020
(Continued)

OTHER PUBLICATIONS

Qualcomm, Summary for WI on NR-based access to unlicensed spectrum, 3GPP TSG RAN Meeting #90e, RP-202753, Dec. 11, 2020. the entire document.
(Continued)

*Primary Examiner* — Michael J Moore, Jr.
(74) *Attorney, Agent, or Firm* — HAUPTMAN HAM, LLP

(57) ABSTRACT

A feedback method, a user equipment, and a storage medium are provided in implementations of the disclosure. In the feedback method, when a data packet of a second user equipment is to be transmitted and the second user equipment receives a listen before talk (LBT) failure indication, the second user equipment sends a negative acknowledgement (NACK) or an acknowledgement (ACK) to a network device on a target physical uplink control channel (PUCCH), where the target PUCCH is a PUCCH corresponding to a first transmission resource used for transmitting the data packet.

19 Claims, 3 Drawing Sheets

┌──────────────────────────────────────────────────────┐
│ WHEN THE DATA PACKET IS TO BE TRANSMITTED               │   S501
│ AND THE LBT FAILURE INDICATION IS RECEIVED, THE         │
│ SECOND USER EQUIPMENT OBTAINS A FIRST TIMER             │
└──────────────────────────────────────────────────────┘

┌──────────────────────────────────────────────────────┐
│ THE SECOND USER EQUIPMENT PERFORMS THE                  │   S502
│ HARQ FEEDBACK BASED ON WHETHER THE FIRST                │
│ TIMER IS RUNNING                                        │
└──────────────────────────────────────────────────────┘

(56)     References Cited

U.S. PATENT DOCUMENTS

| | | | | |
|---|---|---|---|---|
| 2021/0037567 | A1 | 2/2021 | Bhattad et al. | |
| 2021/0136783 | A1* | 5/2021 | Fakoorian | H04W 76/14 |
| 2021/0400704 | A1* | 12/2021 | Xue | H04L 5/0091 |
| 2022/0150027 | A1* | 5/2022 | Sun | H04L 1/1861 |
| 2022/0150949 | A1* | 5/2022 | Sun | H04W 74/0808 |
| 2022/0150960 | A1* | 5/2022 | Sun | H04W 72/0453 |
| 2022/0191795 | A1* | 6/2022 | Pan | H04W 52/0219 |
| 2022/0191835 | A1* | 6/2022 | Lee | H04W 72/23 |
| 2022/0210860 | A1* | 6/2022 | Chin | H04W 72/23 |
| 2022/0264646 | A1* | 8/2022 | Wang | H04W 74/0866 |
| 2022/0321270 | A1* | 10/2022 | Yang | H04L 1/1854 |
| 2022/0386325 | A1* | 12/2022 | Zhao | H04W 72/569 |
| 2023/0111565 | A1* | 4/2023 | Lee | H04L 5/0055 |
| | | | | 370/329 |
| 2023/0113672 | A1* | 4/2023 | Wu | H04L 1/1861 |
| | | | | 370/329 |
| 2023/0397034 | A1* | 12/2023 | Ko | H04W 28/02 |
| 2024/0098782 | A1* | 3/2024 | Han | H04W 74/0808 |
| 2024/0204966 | A1* | 6/2024 | Liu | H04L 5/0055 |

FOREIGN PATENT DOCUMENTS

| | | | | | |
|---|---|---|---|---|---|
| CN | 111435885 | A | 7/2020 | | |
| CN | 111436154 | A | 7/2020 | | |
| CN | 112399588 | A | 2/2021 | | |
| CN | 112586078 | A | 3/2021 | | |
| EP | 3972171 | A1 * | 3/2022 | | H04W 72/23 |
| WO | WO-2020033237 | A1 * | 2/2020 | | H04L 5/0055 |

OTHER PUBLICATIONS

WIPO, International Search Report and Written Opinion for International Application No. PCT/CN2022/087115, Jul. 6, 2022.

Apple "Considerations on N$ V2X mode 2 resource allocation mechanism" 3GPP TSG RAN WG1 #98 R1-1909051, dated Aug. 26-30, 2019.

First Office Action issued in corresponding CN application No. 202110411722.6 dated Mar. 21, 2024.

Notification of grant of patent right for invention issued in corresponding CN application No. 202110411722.6 dated Nov. 8, 2024.

* cited by examiner

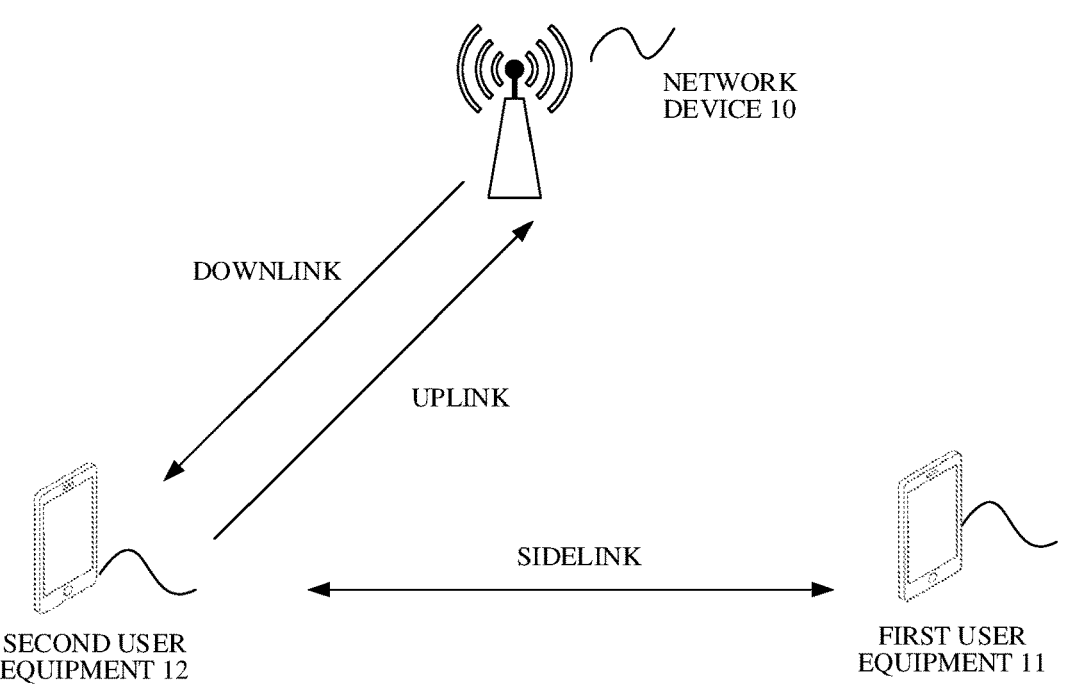
FIG. 1
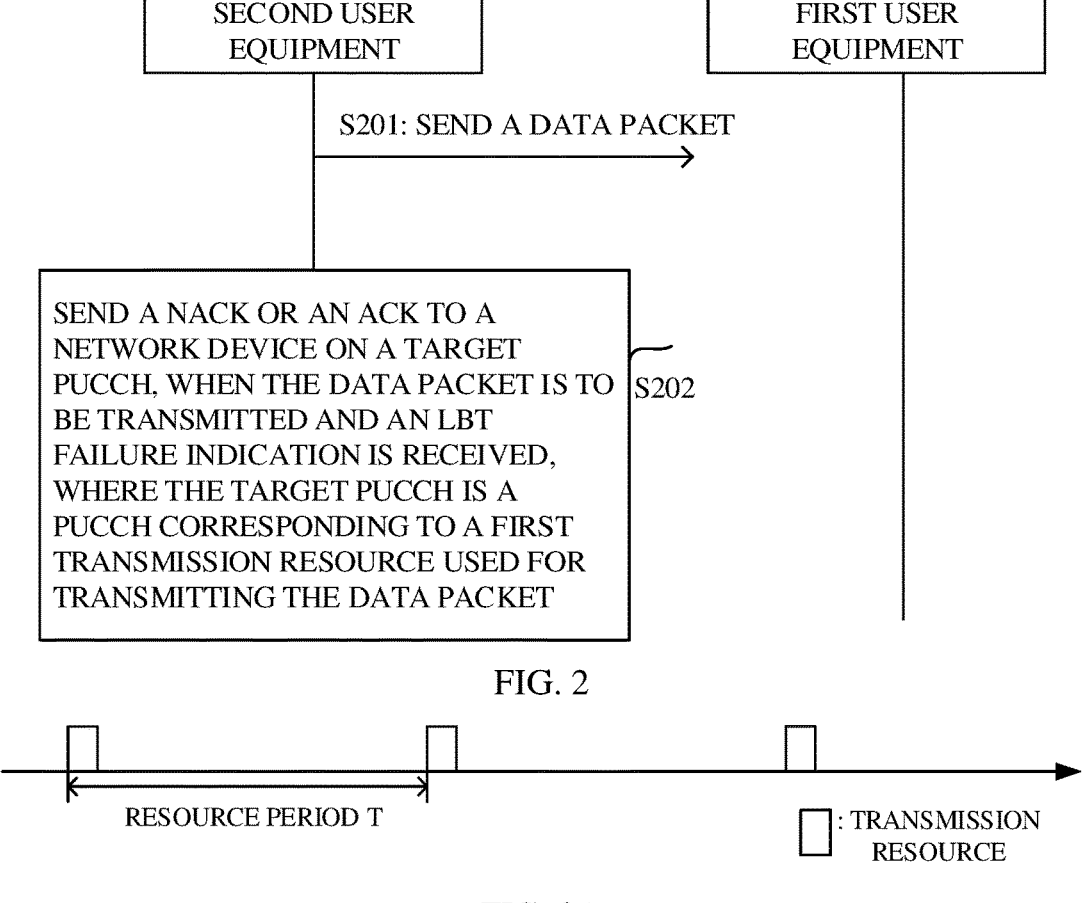
FIG. 2
FIG. 3A

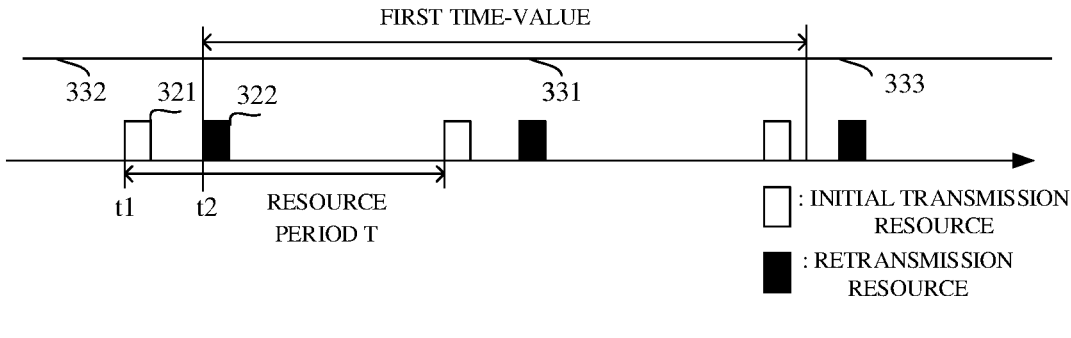

FIG. 3B

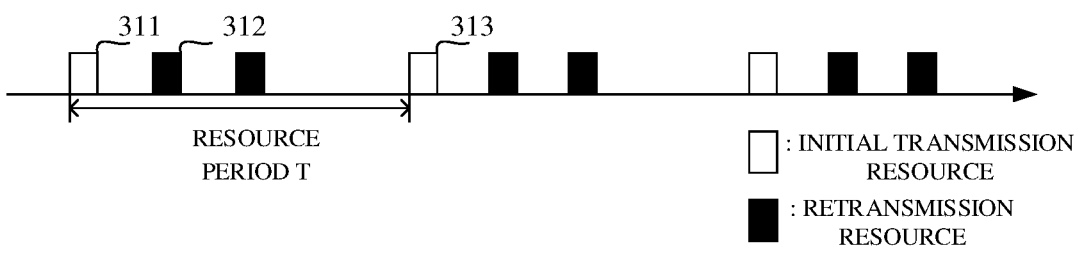

FIG. 3C

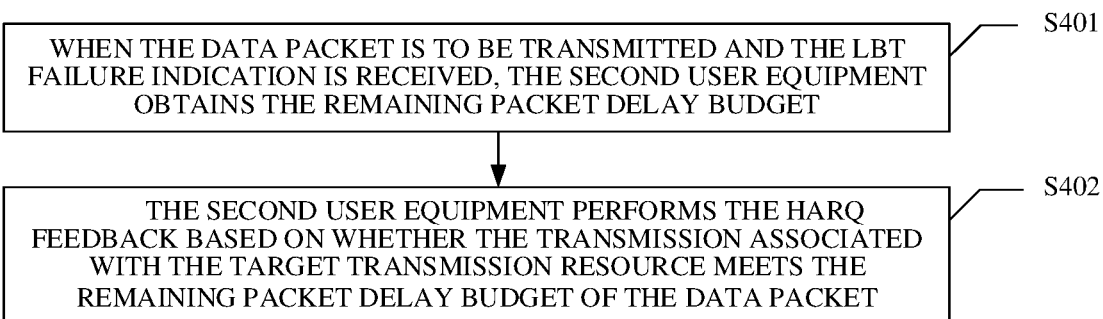

WHEN THE DATA PACKET IS TO BE TRANSMITTED AND THE LBT FAILURE INDICATION IS RECEIVED, THE SECOND USER EQUIPMENT OBTAINS THE REMAINING PACKET DELAY BUDGET — S401

THE SECOND USER EQUIPMENT PERFORMS THE HARQ FEEDBACK BASED ON WHETHER THE TRANSMISSION ASSOCIATED WITH THE TARGET TRANSMISSION RESOURCE MEETS THE REMAINING PACKET DELAY BUDGET OF THE DATA PACKET — S402

FIG. 4

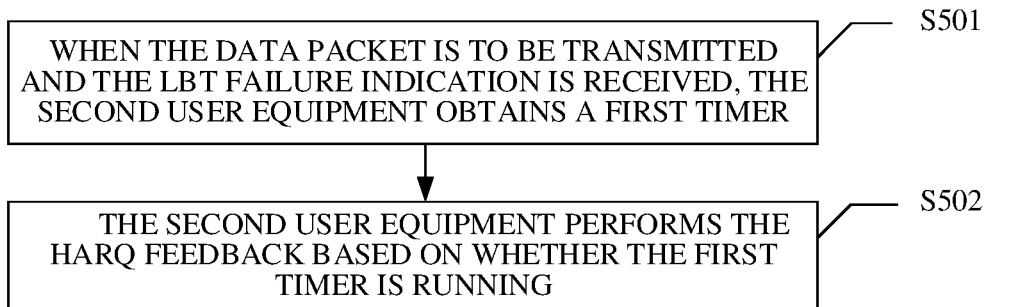

WHEN THE DATA PACKET IS TO BE TRANSMITTED AND THE LBT FAILURE INDICATION IS RECEIVED, THE SECOND USER EQUIPMENT OBTAINS A FIRST TIMER — S501

THE SECOND USER EQUIPMENT PERFORMS THE HARQ FEEDBACK BASED ON WHETHER THE FIRST TIMER IS RUNNING — S502

FIG. 5

WHEN THE DATA PACKET IS TO BE TRANSMITTED AND THE LBT FAILURE INDICATION IS RECEIVED, THE SECOND USER EQUIPMENT OBTAINS A SECOND TIMER
S601
THE SECOND USER EQUIPMENT PERFORMS THE HARQ FEEDBACK BASED ON WHETHER THE SECOND TIMER IS RUNNING
S602
FIG. 6
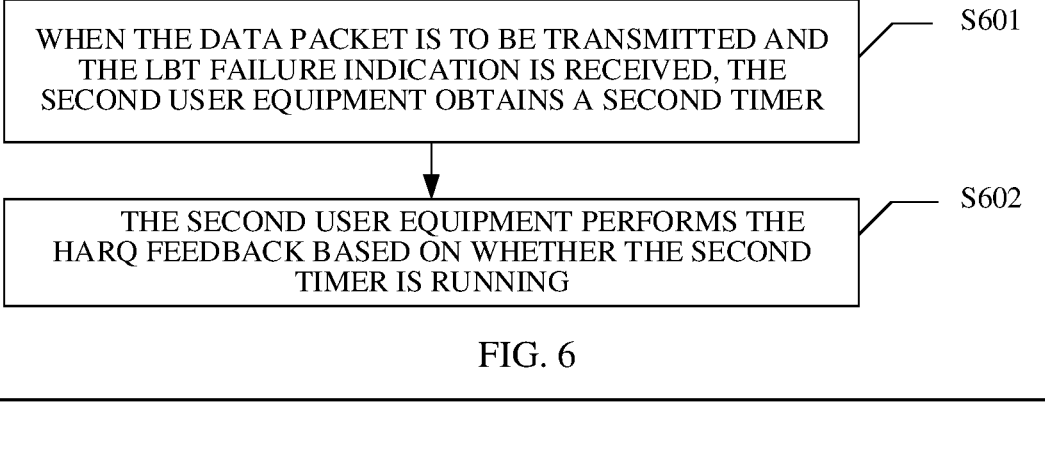
RECEIVING UNIT    701    SENDING UNIT    702
FEEDBACK DEVICE
FIG. 7
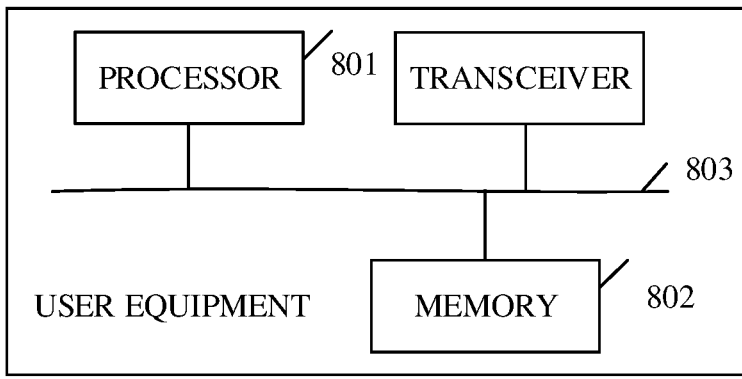
PROCESSOR    801    TRANSCEIVER
803
USER EQUIPMENT    MEMORY    802
FIG. 8

FEEDBACK METHOD, USER EQUIPMENT, AND STORAGE MEDIUM

CROSS-REFERENCE TO RELATED APPLICATION(S)

This application is a National Stage of International Application No. PCT/CN2022/087115, field on Apr. 15, 2022, which claims priority to Chinese Patent Application No. 202110411722.6, filed on Apr. 16, 2021, both of which are incorporated by reference herein.

TECHNICAL FIELD

This disclosure relates to the field of communication technology, in particular to a feedback method, a user equipment, and a storage medium.

BACKGROUND

In a thing-to-thing direct-connection communication system or a sidelink (SL) communication system, when a data packet needs to be transmitted between user equipments, the data packet can be directly transmitted from a second user equipment as a sending end to a first user equipment as a receiving end over the SL without being forwarded by a network device.

The first transmission resource of the second user equipment may be an unlicensed band resource configured by the network device in the thing-to-thing direct-connection communication system or the SL communication system. When the second user equipment transmits the data packet through listen before talk (LBT), the second user equipment may receive an LBT failure indication. For example, when the second user equipment listens that the first transmission resource is occupied by a user equipment other than the second user equipment before transmitting the data packet on the first transmission resource configured by the network device, the first transmission resource configured by the network device to the second user equipment is unavailable, the data packet cannot be sent, and the second user equipment receives the LBT failure indication. In this case, the second user equipment needs to perform hybrid automatic repeat reQuest (HARQ) feedback to the network device.

SUMMARY

In a first aspect, embodiments of the disclosure provide a feedback method. The feedback method includes: sending a negative acknowledgement (NACK) or an acknowledgement (ACK) to a network device on a target physical uplink control channel (PUCCH), when a data packet is to be transmitted and a listen before talk (LBT) failure indication is received, where the target PUCCH is a PUCCH corresponding to a first transmission resource used for transmitting the data packet.

In a second aspect, embodiments of the disclosure provide a user equipment. The user equipment includes a transceiver, a memory, and a processor. The memory stores computer programs. The processor is coupled with the memory and the transceiver. The processor is configured to invoke the computer programs to: cause the transceiver to send a NACK or an ACK to a network device on a target PUCCH, when a data packet is to be transmitted and an LBT failure indication is received, where the target PUCCH is a PUCCH corresponding to a first transmission resource used for transmitting the data packet.

In a third aspect, embodiments of the disclosure provide a non-transitory computer-readable storage medium. The non-transitory computer-readable storage medium stores a computer program. When executed by a user equipment, the computer program causes the user equipment to perform the feedback method of the first aspect.

BRIEF DESCRIPTION OF THE DRAWINGS

To more clearly explain embodiments of the disclosure or technical solutions in the related art, drawings to be used in the description of the embodiments or the related art will be briefly introduced below. Apparently, the drawings described below are merely some embodiments of the disclosure, and other drawings may be obtained from these drawings without creative effort for those of ordinary skill in the art.

FIG. 1 is a schematic structural diagram of an architecture of a network provided in embodiments of the disclosure.

FIG. 2 is a schematic flow chart of a feedback method provided in embodiments of the disclosure.

FIG. 3A is a schematic diagram of a semi-statically configured transmission resource provided in embodiments of the disclosure.

FIG. 3B is a schematic diagram of another semi-statically configured transmission resource provided in embodiments of the disclosure.

FIG. 3C is a schematic diagram of another semi-statically configured transmission resource provided in embodiments of the disclosure.

FIG. 4 is a schematic flow chart of another feedback method provided in embodiments of the disclosure.

FIG. 5 is a schematic flow chart of another feedback method provided in embodiments of the disclosure.

FIG. 6 is a schematic flow chart of another feedback method provided in embodiments of the disclosure.

FIG. 7 is a schematic structural diagram of a feedback device provided in embodiments of the disclosure.

FIG. 8 is a schematic structural diagram of a user equipment provided in embodiments of the disclosure.

DETAILED DESCRIPTION

A clear and complete description of technical solutions of embodiments of the disclosure will be given below in conjunction with accompanying drawings in the embodiments of the disclosure. Apparently, the described embodiments are merely part of the embodiments of the disclosure rather than all of them. Based on the embodiments in the disclosure, all other embodiments obtained by those of ordinary skill in the art without creative efforts fall within the scope of protection of the disclosure.

With the development of wireless communication technology, demands of the user on communication is increasing. To meet the demands of the user on communication, the thing-to-thing direct-connection communication technology or the sidelink (SL) communication technology is introduced into the wireless communication technology. Different from the traditional wireless cellular network communication technology, the thing-to-thing direct-connection communication technology or the SL communication technology can achieve direct communication between user equipments (UE). The data packet transmitted with the thing-to-thing direct-connection communication technology or the SL communication technology can be directly transmitted from a second user equipment as a sending end to a first user equipment as a receiving end through SL without being forwarded by a network device. For convenience of description, in the embodiments of the disclosure, the SL communication technology is illustrated as an example.

As illustrated in FIG. 1, FIG. 1 shows a schematic diagram of an architecture of a network system applying the SL communication technology. As shown in FIG. 1, the network system includes a network device 10, a first user equipment 11, and a second user equipment 12. The second user equipment 12 and the network device 10 establish a communication connection through the traditional wireless cellular network communication technology, and can communicate over an uplink and a downlink. The second user equipment 12 and the first user equipment 11 establish a communication connection through the SL communication technology and can communicate over the sidelink. The second user equipment 12 may serve as a sending end in the SL communication and the first user equipment 11 may serve as a receiving end in the SL communication.

The network device 10 may refer to a device capable of configuring a transmission resource(s) for the second user equipment 12. The network device 10 may be a next generation base station (gNode B, gNB), an evolved Node B (eNB), a Node B (NB), a radio network controller (RNC), a base station controller (BSC), a base transceiver station (BTS), a base band unit (BBU), a transmitting and receiving point (TRP), a transmitting point (TP), a mobile switching center, and the like in 5G, which are not limited herein.

The conventional wireless cellular network communication technology may include one or more of: global system for mobile communications (GSM), general packet radio service (GPRS), code division multiple access (CDMA), wideband code division multiple access (WCDMA), time-division code division multiple access (TD-CDMA), long term evolution (LTE), and 5th (5G) generation mobile networks, etc.

The SL communication technology can be applied to various scenarios, including but not limited to device-to-device (D2D) communication, vehicle-to-vehicle (V2V) communication, and the like. Accordingly, the user equipment mentioned in the disclosure can be a terminal device in D2D communication, such as a smart phone, a tablet computer, a wearable terminal device with a wireless communication function (such as a Bluetooth headset), or other portable terminal device. In another example, the user equipment can be a non-portable terminal device such as a desktop computer. The user equipment mentioned in the disclosure can be a vehicle-mounted computer or the like in V2V communication. The user equipment includes the first user equipment 11 or the second user equipment 12.

In the above network system, the second user equipment 12 can obtain a first transmission resource configured by the network device 10 and transmit a data packet to the first user equipment 11 on the configured first transmission resource. After receiving the data packet, the first user equipment 11 feeds back first feedback information to the second user equipment 12 based on the result of the reception, where the first feedback information includes a negative acknowledgement (NACK) or an acknowledgement (ACK). The first user equipment 11 feeds back the ACK to the second user equipment 12 when the first user equipment 11 successfully receives and decodes the data packet from the second user equipment 12, and feeds back the NACK to the second user equipment 12 when the first user equipment 11 receives but fails to decode the data packet from the second user equipment 12. When the second user equipment 12 receives the first feedback information from the first user equipment 11, the second user equipment 12 needs to feed back second feedback information to the network device 10 based on the first feedback information. The second feedback information is the same as the first feedback information, that is, when the first feedback information is the ACK, the second feedback information is also the ACK; when the first feedback information is the NACK, the second feedback information is also the NACK.

However, if the first transmission resource configured by the network device 10 to the second user equipment 12 is an unlicensed band resource, the second user equipment 12 needs to listen through listen before talk (LBT) when transmitting the data packet. If the LBT failure indication is received, for example, the second user equipment 12 will receive the LBT failure indication when monitoring that the first transmission resource is occupied by other user equipments except the second user equipment 12, then the first transmission resource is unavailable and the second user equipment 12 is unable to transmit the data packet on the first transmission resource. In this case, the first user equipment 11 is unable to receive the data packet from the second user equipment 12, and thus is unable to feed back the first feedback information to the second user equipment 12, so that the second user equipment 12 is unable to feed back the second feedback information to the network device 10 based on the first feedback information. Therefore, in this case how the second user equipment 12 feeds back to the network device 10 is a problem to be solved.

Based on the above description, embodiments of the disclosure provide a feedback method. In the method, when the data packet is to be transmitted (or transmission of the data packet occurs) and the LBT failure indication is received, the second user equipment can send the NACK or the ACK to the network device on a target physical uplink control channel (PUCCH), so that the second user equipment can perform hybrid automatic repeat reQuest (HARQ) feedback to the network device when the data packet is to be transmitted and the LBT failure indication is received.

The feedback method of embodiments of the disclosure is described in detail, which is applied to the second user equipment in the network system. Referring to FIG. 2, FIG. 2 shows a schematic flow chart of a feedback method. As shown in FIG. 2, the feedback method includes S201-S202.

S201, the second user equipment sends a data packet to a first user equipment.

The data packet can refer to the data packet transmitted on the SL operating in the unlicensed band. The unlicensed band refers to the band other than the licensed band, for example, the 2.4 GHz band, the 5 GHz band, and the 6 GHz band, etc. The data packet mentioned in the disclosure can also be called media access control protocol data unit (MAC PDU).

S202, the second user equipment sends a NACK or an ACK to a network device on a target PUCCH, when the data packet is to be transmitted and an LBT failure indication is received, where the target PUCCH is a PUCCH corresponding to a first transmission resource used for transmitting the data packet.

In one embodiment, the second user equipment needs to perform LBT before transmitting the last data packet to-be-transmitted on the first transmission resource. If the second user equipment receives the LBT failure indication, the data packet which is to be transmitted cannot be sent due to the LBT failure. In this case, the second user equipment needs to send the NACK or the ACK to the network device on the target PUCCH.

The second user equipment sending the NACK or the ACK to the network device on the target PUCCH may include any one of the following: the second user equipment sending the NACK to the network device on the target PUCCH and the second user equipment sending the ACK to the network device on the target PUCCH.

In one embodiment, when the second user equipment sends the NACK to the network device on the target PUCCH, the network device may receive the NACK from the second user equipment. In this case, the network device may send, in response to the NACK, configuration information of a second transmission resource to the second user equipment. As such, the second user equipment may obtain the second network resource configured by the network device based on the configuration information, and use the second transmission resource to send to the first user equipment the data packet which cannot be sent due to the LBT failure.

The transmission resource may be a resource configured by the network device for transmitting the data packet. Alternatively, the first transmission resource may be a dynamically configured transmission resource, i.e., a dynamic grant or a dynamic resource, where the dynamically configured transmission resource can only be used once. Alternatively, the first transmission resource may also be a semi-statically configured transmission resource, i.e., a configured grant or a semi-static resource. The semi-statically configured transmission resource is periodically repetitive transmission resource. The second user equipment can receive from the network device configuration information of a transmission resource(s) in one resource period, and determine configuration information of transmission resources in multiple resource periods based on the configuration information of the transmission resource in the one resource period, to obtain the transmission resources in the multiple resource periods. The resource period can also be called the configured grant period. In one embodiment, on transmission resource may be included in one resource period. Referring to FIG. 3A, FIG. 3A shows a schematic diagram of a semi-statically configured transmission resource, where the transmission resource can be represented by a rectangular box. As shown in FIG. 3A, one transmission resource is included in one resource period T. In another embodiment, multiple transmission resources may be included in one resource period, where the 1st transmission resource among the multiple transmission resources in one resource period may be referred to as a transmission resource at an initial position or an initial transmission resource, and a transmission resource other than the 1st transmission resource among the multiple transmission resources in one resource period may be referred to as a retransmission resource. Referring to FIG. 3B, FIG. 3B shows a schematic diagram of another semi-statically configured transmission resource. The initial transmission resource can be represented by a white rectangular box and the retransmission resource can be represented by a black rectangular box. As shown in FIG. 3B, one resource period T may have one initial transmission resource and one retransmission resource. It should be noted that, one resource period T may have more retransmission resources, for example, one initial transmission resource and two retransmission resources can be included in one resource period T, as shown in FIG. 3C. Embodiments of the disclosure are not limited thereto. The transmission resource can refer to a time domain resource. The transmission resource may include a first transmission resource or a second transmission resource.

The target PUCCH refers to the PUCCH corresponding to the first transmission resource. When the first transmission resource is a dynamically configured transmission resource, the target PUCCH may be the PUCCH closest to the first transmission resource after the first transmission resource.

When the first transmission resource is a semi-statically configured transmission resource, optionally, the target PUCCH may be the PUCCH closest to the first transmission resource after the first transmission resource. Optionally, the target PUCCH may also be a PUCCH after and closest to the resource period of the first transmission resource.

In embodiments of the disclosure, the second user equipment may perform the HARQ feedback on the target PUCCH when the data packet is to be transmitted and the LBT failure indication is received.

In one embodiment, regardless of whether the first transmission resource is the dynamically configured or the semi-statically configured transmission resource, if the data packet is to be transmitted and the LBT failure indication is received, the second user equipment sends the NACK to the network device on the target PUCCH. Otherwise, the second user equipment sends the ACK to the network device on the target PUCCH.

How the second user equipment performs the HARQ feedback when the first transmission resource is the dynamically configured transmission resource or when the first transmission resource is the semi-statically configured transmission resource is described below.

When the first transmission resource is the dynamically configured transmission resource, in one embodiment, if the data packet is to be transmitted and the LBT failure indication is received, the second user equipment sends the NACK to the network device on the target PUCCH. Otherwise, the second user equipment sends the ACK to the network device on the target PUCCH. When the first transmission resource is the semi-statically configured transmission resource, in one embodiment, the second user equipment may perform the HARQ feedback based on whether a transmission associated with the target transmission resource meets the remaining packet delay budget (PDB) of the data packet. Referring to FIG. 4, FIG. 4 shows a schematic flow chart of another feedback method. As shown in FIG. 4, the feedback method may include the following S401-S402.

S401, when the data packet is to be transmitted and the LBT failure indication is received, the second user equipment obtains the remaining packet delay budget.

The remaining packet delay budget is one of standard attributes of the quality of service class identifier (QoS class identifier, QCI) of the QoS parameter in the bearer level, and indicates the time that the data packet might be delayed between the second user equipment and the first user equipment.

S402, the second user equipment performs the HARQ feedback based on whether the transmission associated with the target transmission resource meets the remaining packet delay budget of the data packet.

The target transmission resource can refer to the semi-static transmission resource configured by the network device. When the data packet is to be transmitted and the LBT failure indication is received, the second user equipment may attempt to transmit the data packet on the target transmission resource. However, the second user equipment needs to determine whether the transmission associated with the target transmission resource meets the remaining packet delay budget of the data packet before the second user equipment transmits the data packet on the target transmission resource, and the target transmission resource can be used to transmit the data packet only if the transmission associated with the target transmission resource meets the remaining packet delay budget of the data packet. Thus, the second user equipment may perform HARQ feedback based on whether the transmission associated with the target transmission resource meets the remaining packet delay budget of the data packet. When the transmission associated with the target transmission resource does not meet the remaining packet delay budget of the data packet, the second user equipment sends the NACK to the network device on the target PUCCH, i.e., the NACK is sent when the transmission associated with the target transmission resource does not meet the remaining packet delay budget of the data packet. When the transmission associated with the target transmission resource meets the remaining packet delay budget of the data packet, the second user equipment sends the ACK to the network device on the target PUCCH, i.e., the ACK is sent when the transmission associated with the target transmission resource meets the remaining packet delay budget of the data packet.

The transmission associated with the target transmission resource may refer to the time period between the target PUCCH and the target transmission resource. Then, as described above, the second user equipment transmits the NACK to the network device on the target PUCCH when the transmission associated with the target transmission resource does not meet the remaining packet delay budget of the data packet. It may also mean that the second user equipment transmits the NACK to the network device on the target PUCCH when the time period between the target PUCCH and the target transmission resource is greater than or equal to the remaining packet delay budget. Accordingly, the second user equipment transmits the ACK to the network device on the target PUCCH when the transmission associated with the target transmission resource meets the remaining packet delay budget of the data packet. It may also mean that the second user equipment transmits the ACK to the network device on the target PUCCH when the time period between the target PUCCH and the target transmission resource is less than the remaining packet delay budget. The time period between the target PUCCH and the target transmission resource may include multiple cases, for example, the time period between the target PUCCH and the target transmission resource may refer to the time period between the starting position of the target PUCCH and the starting position of the target transmission resource. For another example, the time period between the target PUCCH and the target transmission resource may refer to the time period between the starting position of the target PUCCH and the ending position of the target transmission resource. For another example, the time period between the target PUCCH and the target transmission resource may refer to the time period between the ending position of the target PUCCH and the starting position of the target transmission resource. For another example, the time period between the target PUCCH and the target transmission resource may refer to the time period between the ending position of the target PUCCH and the ending position of the target transmission resource, and the like.

Alternatively, the target transmission resource may be the transmission resource closest to the target PUCCH among the transmission resources after the target PUCCH and having the same size as the data packet. The transmission resources after the target PUCCH may include multiple transmission resources. The second user equipment can determine the target transmission resource as follows. In one embodiment, the second user equipment may sequentially query the size of each of the multiple transmission resources after the target PUCCH until a transmission resource of the same size as the data packet is queried as the target transmission resource. In another embodiment, the second user equipment may find transmission resources of the same size as the data packet from the multiple transmission resources, and then find a transmission resource closest to the target PUCCH from the transmission resources of the same size as the data packet.

Alternatively, the target transmission resource may be the transmission resource closest to the target PUCCH among the transmission resources subsequent to the target PUCCH and supporting the size of the transmission data packet. The transmission resource supporting the size of the transmission data packet may include transmission resources each having a size greater than or equal to the size of the data packet. The determination of the target transmission resource by the second user equipment can refer to the relevant description of the above embodiments.

Optionally, the target transmission resource may be a transmission resource that is located after and closest to the first transmission resource in the resource period for the first transmission resource. Referring to FIG. 3C, assuming that the 1st transmission resource 311 in the first resource period in FIG. 3C is the first transmission resource, the 2nd transmission resource 312 in the first resource period may be determined as the target transmission resource.

Alternatively, the target transmission resource may be a transmission resource located at a starting position in the next resource period of the resource period in which the first transmission resource locates. Assuming that the first transmission resource is a transmission resource in the first resource period, as shown at 311 in FIG. 3C, the 1st transmission resource 313 in the second resource period may be determined as the target transmission resource.

In the embodiment, the second user equipment may perform the HARQ feedback based on whether the transmission associated with the target transmission resource meets the remaining packet delay budget of the data packet. The ACK is transmitted when the transmission associated with the target transmission resource meets the remaining packet delay budget of the data packet, and the NACK is transmitted when the transmission associated with the target transmission resource does not meet the remaining packet delay budget of the data packet. That is, when the target transmission resource meets the remaining packet delay budget, the second user equipment can try to use the target transmission resource to transmit the data packet first, and when the target transmission resource does not meet the remaining packet delay budget, the second user equipment sends the NACK to the network device to request the second transmission resource. As such, the configured semi-static transmission resource can be fully utilized to improve the resource utilization rate.

As described in the foregoing embodiments, when the data packet is to be transmitted and the LBT failure indication is received, the second user equipment may perform the HARQ feedback based on whether the transmission associated with the target transmission resource meets the remaining packet delay budget of the data packet. In another embodiment, the second user equipment may also determine whether the data packet can be transmitted on the target transmission resource based on a timer. Referring to FIG. 5, FIG. 5 shows a schematic flow chart of another feedback method. As shown in FIG. 5, the feedback method may include S501-S502.

S501, when the data packet is to be transmitted and the LBT failure indication is received, the second user equipment obtains a first timer.

The first timer may be started when the data packet is to be transmitted.

In one embodiment, if the first timer is started when the data packet is to be transmitted for the first time (the 1st transmission or initial transmission), the first timer may be started at the starting position of the 1st transmission. As shown in FIG. 3B, assuming that the 1st transmission resource 321 is the resource used for the 1st transmission of the data packet, the first timer may be started at the starting position of the 1st transmission resource 321, i.e., at time t1 as shown in FIG. 3B. Optionally, the transmission of the data packet transmitted by the second user equipment on the first transmission resource may be the 1st transmission, and in this case, the first transmission resource may be the 1st transmission resource 321. Optionally, the transmission of the data packet transmitted by the second user equipment on the first transmission resource may not be the 1st transmission, and in this case the first transmission resource may be the 2nd transmission resource 322.

In another embodiment, if the first timer is started when the data packet is to be transmitted, the first timer may be started at the starting position of the first transmission resource. As shown in FIG. 3B, the first timer is started at time t1 if the first transmission resource is 321 and the first timer is started at time t2 if the first transmission resource is 322.

S502, the second user equipment performs the HARQ feedback based on whether the first timer is running.

Optionally, the second user equipment may perform the HARQ feedback based on the first timer. When the first timer is running, the second user equipment may send the NACK to the network device on the target PUCCH, i.e., the NACK is sent when the first timer is running. When the first timer is not running, the second user equipment may send the ACK to the network device on the target PUCCH, i.e., the ACK is sent when the first timer is not running.

The running of the first timer means that: the first timer is started and the running duration is less than or equal to a first time-value. Otherwise, the first timer is not running. As shown in FIG. 3B, assuming that the first timer is started at time t2, the first timer may run within the region 331. In the region 332 and in the region 333, the first timer is not running.

It should be understood that, when the first timer is not running, if the data packet is to be transmitted, the first timer can be started and the first timer starts to run. In the following time, the first timer keeps running, and the running duration is less than or equal to the first time-value. In this case, if the data packet is to be transmitted, the first timer can be restarted at this time. In the following time, if the running duration of the first timer is longer than the first time-value, the first timer can be stopped. Then, the first timer can be started again only when the data packet is to be transmitted.

In the embodiment, the second user equipment may perform the HARQ feedback based on whether the first timer is running. The NACK is sent when the first timer is running, and the ACK is sent when the first timer is not running. That is, when the first timer is not running, the second user equipment can first try to use the target transmission resource to transmit the data packet, and when the first timer is running, the second user equipment sends the NACK to the network device to request the second transmission resource. As such, the configured semi-static transmission resource can be fully utilized and the resource utilization rate can be improved.

In addition to the method shown in FIG. 5, embodiments of the disclosure may perform the HARQ feedback based on the feedback method shown in FIG. 6. Referring to FIG. 6, FIG. 6 shows a schematic flow chart of another feedback method, which may include S601-S602.

S601, when the data packet is to be transmitted and the LBT failure indication is received, the second user equipment obtains a second timer.

The second timer may be started when the data packet is to be transmitted.

In one embodiment, if the second timer is started when the data packet is to be transmitted for the first time (the 1st transmission), the second timer may be started at the starting position of the 1st transmission. Optionally, the transmission of the data packet transmitted by the second user equipment on the first transmission resource may be the 1st transmission. Optionally, the transmission of the data packet transmitted by the second user equipment on the first transmission resource may not be 1st transmission. In another embodiment, if the second timer is started when the data packet is to be transmitted, the second timer may be started at the starting position of the first transmission resource. The specific implementation of the second timer can refer to the related description of the first timer in FIG. 5, which will not be repeated herein.

S602, the second user equipment performs the HARQ feedback based on whether the second timer is running.

Optionally, the second user equipment may perform the HARQ feedback based on the second timer. When the second timer is running, the second user equipment may send the ACK to the network device on the target PUCCH, i.e., the ACK is sent when the first timer is running. When the first timer is not running, the second user equipment may send the NACK to the network device on the target PUCCH, i.e., the NACK is sent when the first timer is not running.

The running of the second timer operation means that the second timer is started and the running duration is less than or equal to a second time-value. Otherwise, the second timer is not running.

It should be understood that, when the second timer is not running, if the data packet is to be transmitted, the second timer can be started and the second timer starts to run. In the following time, the second timer keeps running, and the running duration is less than or equal to the second time-value. In this case, if the data packet is to be transmitted, the second timer can be restarted at this time. In the following time, if the running duration of the second timer is longer than the second time-value, the second timer can be stopped. In this case, the second timer can be started again only when the data packet is to be transmitted.

In the embodiment, the second user equipment may perform the HARQ feedback based on whether the second timer is running. The ACK is sent when the second timer is running, and the NACK is sent when the second timer is not running. That is, when the second timer is running, the second user equipment can first try to use the target transmission resource to transmit the data packet, and when the second timer is not running, the second user equipment sends the NACK to the network device to request the second transmission resource. As such, the configured semi-static transmission resource can be fully utilized and the resource utilization rate can be improved.

Based on the feedback method described above, when the data packet of the second user equipment is to be transmitted and the second user equipment receives the LBT failure indication, the NACK or the ACK may be transmitted to the network device on the target PUCCH corresponding to the first transmission resource for transmitting the data packet.

In some feasible implementations, the data packet is transmitted over an SL.

In some feasible implementations, sending the NACK or the ACK to the network device on the target PUCCH includes: sending the NACK to the network device on the target PUCCH.

In some feasible implementations, the method further includes: obtaining a second transmission resource configured by the network device, where the second transmission resource is configured when the network device receives the NACK; and sending the data packet to a first user equipment on the second transmission resource.

In some feasible implementations, the first transmission resource is a dynamically configured transmission resource.

In some feasible implementations, the NACK is sent when a transmission associated with a target transmission resource does not meet a remaining packet delay budget of the data packet.

In some feasible implementations, the ACK is sent when a transmission associated with a target transmission resource meets a remaining packet delay budget of the data packet.

In some feasible implementations, the NACK is sent when a first timer is running; and the ACK is sent when the first timer is not running.

In some feasible implementations, the first timer is started when the data packet is to be transmitted.

In some feasible implementations, the first timer is started when the data packet is to be transmitted for the first time.

In some feasible implementations, the NACK is sent when a second timer is not running; and the ACK is sent when the second timer is running.

In some feasible implementations, the second timer is started when the data packet is to be transmitted.

In some feasible implementations, the second timer is started when the data packet is to be transmitted for the first time.

In some feasible implementations, the first transmission resource is a semi-statically configured transmission resource.

In some feasible implementations, the target transmission resource is a transmission resource closest to the target PUCCH among transmission resources after the target PUCCH and having the same size as the data packet; or the target transmission resource is a transmission resource at a starting position in a resource period next to a resource period where the first transmission resource is.

Referring to FIG. 7, FIG. 7 is a schematic structural diagram of a feedback device of embodiments of the disclosure. The feedback device may be a user equipment, a device in the user equipment, or a device used with the user equipment. The feedback device shown in FIG. 7 may include a receiving unit 701 and a sending unit 702.

The receiving unit 701 is configured to receive an LBT failure indication. The sending unit 702 is configured to send a NACK or an ACK to a network device on a target PUCCH, when a data packet is to be transmitted and the LBT failure indication is received, where the target PUCCH is a PUCCH corresponding to a first transmission resource used for transmitting the data packet.

In some feasible implementations, the data packet is transmitted over an SL.

In some feasible implementations, the sending unit 702 configured to send the NACK or the ACK to the network device on the target PUCCH is configured to: send the NACK to the network device on the target PUCCH.

In some feasible implementations, the receiving unit 701 of the feedback device is further configured to: obtain a second transmission resource configured by the network device, where the second transmission resource is configured when the network device receives the NACK; and the sending unit 702 of the feedback device is further configured to: send the data packet to a first user equipment on the second transmission resource.

In some feasible implementations, the first transmission resource is a dynamically configured transmission resource.

In some feasible implementations, the NACK is sent when a transmission associated with a target transmission resource does not meet a remaining packet delay budget of the data packet.

In some feasible implementations, the ACK is sent when a transmission associated with a target transmission resource meets a remaining packet delay budget of the data packet.

In some feasible implementations, the NACK is sent when a first timer is running; and the ACK is sent when the first timer is not running.

In some feasible implementations, the first timer is started when the data packet is to be transmitted.

In some feasible implementations, the first timer is started when the data packet is to be transmitted for the first time.

In some feasible implementations, the NACK is sent when a second timer is not running; and the ACK is sent when the second timer is running.

In some feasible implementations, the second timer is started when the data packet is to be transmitted.

In some feasible implementations, the second timer is started when the data packet is to be transmitted for the first time.

In some feasible implementations, the first transmission resource is a semi-statically configured transmission resource.

In some feasible implementations, the target transmission resource is a transmission resource closest to the target PUCCH among transmission resources after the target PUCCH and having the same size as the data packet; or the target transmission resource is a transmission resource at a starting position in a resource period next to a resource period where the first transmission resource is.

The feedback device may be, for example, a chip or a chip module. As described in the above embodiments, the devices and the units included in the product may be software units, hardware units, or may be partially software units and partially hardware units. For example, for each device or product applied to or integrated in the chip, each unit contained therein may be implemented in a hardware manner such as a circuit, or at least part of the units may be implemented in a software program, where the software program runs on a processor integrated in the chip, and the remaining (if any) part of the units may be implemented in hardware such as circuit. For each device or product applied to or integrated in the chip module, each unit contained therein may be implemented in hardware such as circuit, and different units may be located in the same component (e.g. chip, circuit unit, etc.) or in different components of the chip module, or at least part of the units may be implemented in the form of a software program, where the software program runs in a processor integrated inside the chip module, and the remaining (if any) part of the units may be implemented in hardware such as circuit. For each device or product applied to or integrated in the user equipment, each unit contained therein may be implemented in hardware such as circuit, different units may be located in the same component (e.g. chip, circuit unit, etc.) or in different components of the user equipment, or at least part of the units may be implemented in software program, where the software program runs on a processor integrated in the user equipment, and the remaining (if any) part of the units may be implemented in hardware such as circuit. The user equipment may refer to the second user equipment mentioned in the foregoing method embodiments.

The related contents of the embodiment can be referred to the related contents of the above method embodiments. It will not be described in detail herein. The embodiment of the disclosure and the above method embodiments are based on the same concept and bring the same technical effect. For the specific principle, reference is made to the description of the above method embodiments, which will not be repeated herein.

Referring to FIG. 8, FIG. 8 is a schematic structural diagram of a user equipment provided in embodiments of the disclosure. The user equipment may refer to the second user equipment mentioned in the above method embodiments. The user equipment includes a processor 801, a memory 802, and a transceiver. The processor 801, the memory 802, and the transceiver are connected via one or more communication buses 803.

The processor 801 may be a central processing unit (CPU). The processor may also be a general purpose processor, a digital signal processor (DSP), an application specific integrated circuit (ASIC), a field-programmable gate array (FPGA), or other programmable logic device, a discrete gate or transistor logic device, a discrete hardware component, or the like. The general purpose processor may be a microprocessor or the processor may be any common processor or the like. The processor 801 is configured to support the user equipment to perform corresponding functions of the user equipment in the method described in FIG. 2, FIG. 4, FIG. 5, or FIG. 6.

The memory 802 may include a read-only memory and a random access memory and provide computer programs and data to the processor 801. A part of the memory 802 may also include a non-transitory random access memory. When invoking the computer programs, the processor 801 performs the following.

A NACK or an ACK is sent to a network device on a target PUCCH, when a data packet is to be transmitted and the LBT failure indication is received, where the target PUCCH is a PUCCH corresponding to a first transmission resource used for transmitting the data packet.

In some feasible implementations, the data packet is transmitted over an SL.

In some feasible implementations, the processor 801 configured to send the NACK or the ACK to the network device on the target PUCCH is configured to: send the NACK to the network device on the target PUCCH.

In some feasible implementations, the processor 801 is further configured to: obtain a second transmission resource configured by the network device, where the second transmission resource is configured when the network device receives the NACK; and send the data packet to a first user equipment on the second transmission resource.

In some feasible implementations, the first transmission resource is a dynamically configured transmission resource.

In some feasible implementations, the NACK is sent when a transmission associated with a target transmission resource does not meet a remaining packet delay budget of the data packet.

In some feasible implementations, the ACK is sent when a transmission associated with a target transmission resource meets a remaining packet delay budget of the data packet.

In some feasible implementations, the NACK is sent when a first timer is running; and the ACK is sent when the first timer is not running.

In some feasible implementations, the first timer is started when the data packet is to be transmitted.

In some feasible implementations, the first timer is started when the data packet is to be transmitted for the first time.

In some feasible implementations, the NACK is sent when a second timer is not running; and the ACK is sent when the second timer is running.

In some feasible implementations, the second timer is started when the data packet is to be transmitted.

In some feasible implementations, the second timer is started when the data packet is to be transmitted for the first time.

In some feasible implementations, the first transmission resource is a semi-statically configured transmission resource.

In some feasible implementations, the target transmission resource is a transmission resource closest to the target PUCCH among transmission resources after the target PUCCH and having the same size as the data packet; or the target transmission resource is a transmission resource at a starting position in a resource period next to a resource period where the first transmission resource is.

The related contents of the embodiment can be referred to the related contents of the above method embodiments. It will not be described in detail herein. The embodiment of the disclosure and the above method embodiments are based on the same concept and bring the same technical effect. For the specific principle, reference is made to the description of the above method embodiments, which will not be repeated herein.

Embodiments of the disclosure provide a chip. The chip can perform the related steps in the above method embodiments.

The chip is configured to: send a NACK or an ACK to a network device on a target PUCCH, when a data packet is to be transmitted and an LBT failure indication is received, where the target PUCCH is a PUCCH corresponding to a first transmission resource used for transmitting the data packet.

In some feasible implementations, the data packet is transmitted over an SL.

In some feasible implementations, the chip configured to send the NACK or the ACK to the network device on the target PUCCH is configured to: send the NACK to the network device on the target PUCCH.

In some feasible implementations, the chip is further configured to: obtain a second transmission resource configured by the network device, where the second transmission resource is configured when the network device receives the NACK; and send the data packet to a first user equipment on the second transmission resource.

In some feasible implementations, the first transmission resource is a dynamically configured transmission resource.

In some feasible implementations, the NACK is sent when a transmission associated with a target transmission resource does not meet a remaining packet delay budget of the data packet.

In some feasible implementations, the ACK is sent when a transmission associated with a target transmission resource meets a remaining packet delay budget of the data packet.

In some feasible implementations, the NACK is sent when a first timer is running; and the ACK is sent when the first timer is not running.

In some feasible implementations, the first timer is started when the data packet is to be transmitted.

In some feasible implementations, the first timer is started when the data packet is to be transmitted for the first time.

In some feasible implementations, the NACK is sent when a second timer is not running; and the ACK is sent when the second timer is running.

In some feasible implementations, the second timer is started when the data packet is to be transmitted.

In some feasible implementations, the second timer is started when the data packet is to be transmitted for the first time.

In some feasible implementations, the first transmission resource is a semi-statically configured transmission resource.

In some feasible implementations, the target transmission resource is a transmission resource closest to the target PUCCH among transmission resources after the target PUCCH and having the same size as the data packet; or the target transmission resource is a transmission resource at a starting position in a resource period next to a resource period where the first transmission resource is.

The related contents of the embodiment can be referred to the related contents of the above method embodiments. It will not be described in detail herein. The embodiment of the disclosure and the above method embodiments are based on the same concept and bring the same technical effect. For the specific principle, reference is made to the description of the above method embodiments, which will not be repeated herein.

Embodiments of the disclosure provide a module device. The module device can perform the related steps in the above method embodiments. The module device includes a processor and a communication interface. The processor is coupled to the communication interface. The communication interface is configured to receive and transmit a signal (s).

The processor is configured to send a NACK or an ACK to a network device on a target PUCCH, when a data packet is to be transmitted and an LBT failure indication is received, where the target PUCCH is a PUCCH corresponding to a first transmission resource used for transmitting the data packet.

In some feasible implementations, the data packet is transmitted over an SL.

In some feasible implementations, the processor configured to send the NACK or the ACK to the network device on the target PUCCH is configured to: send the NACK to the network device on the target PUCCH.

In some feasible implementations, the processor is further configured to: obtain a second transmission resource configured by the network device, where the second transmission resource is configured when the network device receives the NACK; and send the data packet to a first user equipment on the second transmission resource.

In some feasible implementations, the first transmission resource is a dynamically configured transmission resource.

In some feasible implementations, the NACK is sent when a transmission associated with a target transmission resource does not meet a remaining packet delay budget of the data packet.

In some feasible implementations, the ACK is sent when a transmission associated with a target transmission resource meets a remaining packet delay budget of the data packet.

In some feasible implementations, the NACK is sent when a first timer is running; and the ACK is sent when the first timer is not running.

In some feasible implementations, the first timer is started when the data packet is to be transmitted.

In some feasible implementations, the first timer is started when the data packet is to be transmitted for the first time.

In some feasible implementations, the NACK is sent when a second timer is not running; and the ACK is sent when the second timer is running.

In some feasible implementations, the second timer is started when the data packet is to be transmitted.

In some feasible implementations, the second timer is started when the data packet is to be transmitted for the first time.

In some feasible implementations, the first transmission resource is a semi-statically configured transmission resource.

In some feasible implementations, the target transmission resource is a transmission resource closest to the target PUCCH among transmission resources after the target PUCCH and having the same size as the data packet; or the target transmission resource is a transmission resource at a starting position in a resource period next to a resource period where the first transmission resource is.

The related contents of the embodiment can be referred to the related contents of the above method embodiments. It will not be described in detail herein. The embodiment of the disclosure and the above method embodiments are based on the same concept and bring the same technical effect. For the specific principle, reference is made to the description of the above method embodiments, which will not be repeated herein.

Embodiment of the disclosure further provide a computer-readable storage medium. The computer-readable storage medium stores a computer program. When executed by the processor of the user equipment, the computer program implements the feedback method described in the embodiments corresponding to FIG. 2, FIG. 4, FIG. 5, or FIG. 6 of the embodiments of the disclosure, which will not be repeated herein.

The computer-readable storage medium may be an internal storage unit of the user equipment of any of the foregoing embodiments such as a hard disk or memory of the device. The computer-readable storage medium may also be an external storage device of the user equipment, such as a plug-in hard disk, a smart media card (SMC), a secure digital (SD) card, a flash card, and the like equipped on the device. Further, the computer-readable storage medium may also include both the internal storage unit of the user equipment and the external storage device. The computer-readable storage medium is used to store computer programs and other programs and data required by the user equipment. The computer-readable storage medium may also be used to temporarily store data that has been or will be output. The user equipment may refer to the second user equipment mentioned in the above method embodiments.

Those of ordinary skill in the art will appreciate that all or part of the procedures of the above method embodiments can be implemented by a computer program instructing related hardware. The program can be stored in a readable storage medium. When executed, the program can include the procedures of the above method embodiments. The storage medium can be a magnetic disk, an optical disk, a read-only memory (ROM), or a random access memory (RAM), etc.

The above disclosure is only a preferred embodiment of the disclosure, which is not used to limit the scope of the disclosure. Therefore, the equivalent changes made based on the claims of the disclosure still fall within the scope of the disclosure.

What is claimed is:

1. A feedback method, comprising:
sending a negative acknowledgement (NACK) or an acknowledgement (ACK) to a network device on a target physical uplink control channel (PUCCH), when a data packet is to be transmitted and a listen before talk (LBT) failure indication is received, wherein
the target PUCCH is a PUCCH corresponding to a first transmission resource used for transmitting the data packet;
the NACK is sent when a first timer is running; and
the ACK is sent when the first timer is not running.

2. The method of claim 1, wherein the data packet is transmitted over a sidelink (SL).

3. The method of claim 1, wherein sending the NACK or the ACK to the network device on the target PUCCH comprises:
sending the NACK to the network device on the target PUCCH.

4. The method of claim 3, further comprising:
obtaining a second transmission resource configured by the network device, wherein the second transmission resource is configured when the network device receives the NACK; and
sending the data packet to a first user equipment on the second transmission resource.

5. The method of claim 3, wherein the first transmission resource is a dynamically configured transmission resource.

6. The method of claim 1, wherein the NACK is sent when a transmission associated with a target transmission resource does not meet a remaining packet delay budget of the data packet.

7. The method of claim 1, wherein the ACK is sent when a transmission associated with a target transmission resource meets a remaining packet delay budget of the data packet.

8. The method of claim 1, wherein the first timer is started when the data packet is to be transmitted.

9. The method of claim 8, wherein the first timer is started when the data packet is to be transmitted for the first time.

10. The method of claim 1, wherein
the NACK is sent when a second timer is not running; and
the ACK is sent when the second timer is running.

11. The method of claim 10, wherein the second timer is started when the data packet is to be transmitted.

12. The method of claim 11, wherein the second timer is started when the data packet is to be transmitted for the first time.

13. The method of claim 6, wherein the first transmission resource is a semi-statically configured transmission resource.

14. The method of claim 6, wherein the target transmission resource is a transmission resource closest to the target PUCCH among transmission resources after the target PUCCH and having a same size as the data packet.

15. A user equipment, comprising:
a transceiver;
a memory storing computer programs; and
a processor coupled with the memory and the transceiver and configured to invoke the computer programs to:
cause the transceiver to send a negative acknowledgement (NACK) or an acknowledgement (ACK) to a network device on a target physical uplink control channel (PUCCH), when a data packet is to be transmitted and a listen before talk (LBT) failure indication is received, wherein
the target PUCCH is a PUCCH corresponding to a first transmission resource used for transmitting the data packet;
the NACK is sent when a first timer is running; and
the ACK is sent when the first timer is not running.

16. A non-transitory computer-readable storage medium storing a computer program which, when executed by a user equipment, causes the user equipment to:
send a negative acknowledgement (NACK) or an acknowledgement (ACK) to a network device on a target physical uplink control channel (PUCCH), when a data packet is to be transmitted and a listen before talk (LBT) failure indication is received, wherein
the target PUCCH is a PUCCH corresponding to a first transmission resource used for transmitting the data packet;
the NACK is sent when a first timer is running; and
the ACK is sent when the first timer is not running.

17. The method of claim 6, wherein the target transmission resource is a transmission resource at a starting position in a resource period next to a resource period where the first transmission resource is.

18. The user equipment of claim 15, wherein the data packet is transmitted over a sidelink (SL).

19. The user equipment of claim 15, wherein the processor configured to invoke the computer programs to cause the transceiver to send the NACK or the ACK to the network device on the target PUCCH is configured to cause the transceiver to:
send the NACK to the network device on the target PUCCH.

* * * * *